US006311556B1

(12) United States Patent
Lefort et al.

(10) Patent No.: US 6,311,556 B1
(45) Date of Patent: Nov. 6, 2001

(54) MICRO-ACCELEROMETER WITH CAPACITIVE RESONATOR

(75) Inventors: Olivier Lefort; Isabelle Thomas, both of Valence (FR)

(73) Assignee: Sextant Avionique, Velizy Villacoublay (FR)

(*) Notice: Subject to any disclaimer, the term of this patent is extended or adjusted under 35 U.S.C. 154(b) by 0 days.

(21) Appl. No.: 09/424,221

(22) PCT Filed: May 19, 1998

(86) PCT No.: PCT/FR98/00997

§ 371 Date: Nov. 23, 1999

§ 102(e) Date: Nov. 23, 1999

(87) PCT Pub. No.: WO98/53328

PCT Pub. Date: Nov. 26, 1998

(30) Foreign Application Priority Data

May 23, 1997 (FR) .................................. 97 06332

(51) Int. Cl.[7] .................................................. G01P 15/10
(52) U.S. Cl. .............................................................. 73/514.29
(58) Field of Search ........................... 73/514.29, 514.32, 73/514.36, 514.37, 514.21, 514.23

(56) References Cited

U.S. PATENT DOCUMENTS

| 4,805,456 | * | 2/1989 | Howe et al. | 73/514.29 |
| 4,881,408 | * | 11/1989 | Hulsing et al. | 73/514.29 |
| 4,945,765 | * | 8/1990 | Roszhart | 73/514.29 |
| 5,996,411 | * | 12/1999 | Leonardson et al. | 73/514.29 |

FOREIGN PATENT DOCUMENTS

| 42 13 135 A1 | 10/1993 | (DE) . |
| 0 363 003 A2 | 4/1990 | (EP) . |
| 2 162 314 A | 1/1986 | (GB) . |
| 2 215 053 A | 9/1989 | (GB) . |

* cited by examiner

*Primary Examiner*—John E. Chapman
(74) *Attorney, Agent, or Firm*—Oblon, Spivak, McClelland, Maier & Neustadt, P.C.

(57) ABSTRACT

A micro-accelerometer having three micromachined conducting-silicon plates bonded in superposition with the interposition of insulating layers. The central plate includes a subassembly sensitive to acceleration, and a peripheral frame electrically insulated from the subassembly and surrounding the subassembly. The peripheral frame forms a spacer between a lower plate and an upper plate from which it is also electrically insulated. The subassembly includes a base fixed on the lower plate and a cantilevered proof mass suspended from the base, an electrical connection being made between the lower plate and the base of the subassembly. The suspension of the proof mass includes, on the one hand, a central vibrating beam which is connected to the proof mass and to the base and is placed substantially in the horizontal plane of an upper face of the proof mass and, on the other hand, two short side suspension arms which are connected to the base and are placed on either side of the central beam but in a horizontal plane passing substantially through the center of gravity of the proof mass. Such a micro-accelerometer may find application for an aircraft, in the context of assisting with inertial navigation.

20 Claims, 2 Drawing Sheets

MICRO-ACCELEROMETER WITH CAPACITIVE RESONATOR

BACKGROUND OF THE INVENTION

1. Field of the Invention

The invention relates to the production of micro-accelerometers machined in silicon, in particular accelerometers for applications assisting with navigation in aircraft.

More precisely, the invention relates to a resonator accelerometer, in which a micromachined proof mass is connected by a vibrating beam, also micromachined, to a fixed frame forming a part of the framework of the accelerometer. The beam is mechanically tensioned by the weight of the proof mass, and the vibration of the beam is electrostatically excited by a tuned circuit comprising a moving-electrode capacitor, the position of the beam determining the position of the electrode. The electric field applied to the capacitor by the tuned circuit tends to move the beam, and the movement of the beam changes the value of the capacitor of the tuned circuit; the feedback of the tuned circuit is such that mechanical and electrical resonance occurs at a natural vibration frequency of the beam. The resonance frequency, that is to say the frequency at which the beam naturally enters into self-sustained vibration, depends on the mechanical tension longitudinally exerted on it, as is the situation, for example, with a musical instrument string. This mechanical tension itself depends on the acceleration to which the proof mass exerting the tension is subjected. A frequency measurement in the resonant circuit therefore represents an acceleration measurement.

Such a micro-accelerometer is therefore a combination of mechanical structure (proof mass, vibrating beam, other suspension arms, fixed framework) and electrical structure (capacitor electrodes, current-feed connections, and external circuitry forming a resonant circuit).

The characteristics expected of such an accelerometer are principally small size, good sensitivity along a well-identified axis of acceleration measurement, referred to as the sensitive axis, low sensitivity to accelerations along axes perpendicular to the sensitive axis, good linearity and good accuracy in the acceleration measurement, good mechanical strength both in the event of accelerations or impacts in the sense of the sensitive axis and in transverse directions, and lastly a low fabrication cost.

The cost is limited even further by the fact that batch fabrication can be used, which is why silicon-machining processes derived from integrated-circuit fabrication technologies have been envisaged.

2. Discussion of the Background

It has already been proposed, in particular, to produce both the proof mass and its suspension in silicon, the rest of the accelerometer being in quartz, which it is also known how to micromachine, electrical electrodes being deposited on the quartz such that they face towards the active silicon plate. Drawbacks have been observed with these hybrid structures, in particular because this makes it more difficult to produce the electrical parts of the resonator.

Silicon micro-accelerometer structures have also been proposed, in which the vibrating beam constitutes a deformable mechanical support carrying a strain gauge incorporated in a circuit capable of detecting resistance variations and amplifying them to inject them back into an electrostatic drive for the beam. This structure has the advantage of avoiding problems with electrical coupling between the elements which do not actually play a part in the measuring circuit, but fabrication is more complicated, especially because of the need for strain gauges and connections of the electrical circuit. In this case, only one of the plates is electrically active; the other plates are above all used as a closure cover. Errors are moreover induced by the use of heterogeneous materials.

SUMMARY OF THE INVENTION

The object of the present invention is to provide a novel micro-accelerometer structure in silicon technology. This micro-accelerometer is characterized by the following principal arrangements: it has three micromachined-conducting silicon plates welded in superposition with the interposition of insulating layers, the central plate comprising a subassembly sensitive to accelerations, and a peripheral frame electrically insulated from the subassembly and surrounding the subassembly, this frame forming a spacer between a lower plate and an upper plate from which it is also electrically insulated. The subassembly comprises a base fixed on the lower plate and a cantilevered proof mass suspended from the base, an electrical connection being made between the lower plate and the base of the subassembly. The suspension of the proof mass comprises, on the one hand, a central vibrating beam which is connected to the proof mass and to the base and is placed substantially in the horizontal plane of an upper face of the proof mass, and, on the other hand, two short side suspension arms which are connected to the base and are placed on either side of the central beam but in a horizontal plane passing substantially through the center of gravity of the proof mass.

The expression horizontal plane is used here for convenience to denote the parallel plane of the three silicon plates, the accelerometer being assumed to be placed in such a way that the plates are horizontal (the measured accelerations then being vertical because the sensitive axis is perpendicular to the surface of the plates).

The base of the proof subassembly or the proof mass (or both) preferably has a U-shape seen on a horizontal plane, the inside of the U being turned towards the proof mass (or vice versa towards the base), the vibrating beam being connected to the center of the U and the side suspension arms being connected to the ends of the branches of the U. This U-shape makes it possible to produce suspension arms which are short compared with the length of the vibrating beam.

With the aim of avoiding bending deformation on the vibrating beam as far as possible, the point where this beam is fixed on the proof mass lies preferably substantially in line with a fictitious axis of articulation of the proof mass about the fixture represented by the suspension arms. In other words, if it is assumed that in the absence of any connection to the vibrating beam, the proof mass is connected to the base only by the side suspension arms, the suspension behaves somewhat like a horizontal axis of articulation about which the mass can turn, and arrangements are made for the point at which the vibrating beam is fixed on the proof mass to be substantially vertically in line with this axis. This limits the bending deformations of the vibrating beam as far as possible.

Provision may, however, also be made for it instead to be the middle of the vibrating beam which lies substantially in line with the axis of articulation, if it is preferred to promote the thermal stability of the sensor.

This accelerator is excited by connecting the upper plate, on the one hand, and the lower plate, on the other hand, to a resonant circuit, using connection contacts formed on the silicon of these two plates. The electrical voltage applied to the lower plate, via a connection contact on this plate, is transmitted by silicon conduction to the vibrating beam which forms one electrode (in conducting silicon) of a capacitor, opposite an upper-plate portion, also in conducting silicon, which forms the other electrode of the capacitor; this other electrode is electrically connected, once again by direct silicon conduction, to a connection contact on the upper plate. It is not necessary to provide conducting deposits on the silicon plates in order to form the electrodes of the capacitor.

The central plate is preferably connected, via an electrical connection contact on the silicon, to a fixed potential making it possible, by a capacitive screening effect, to avoid high-frequency capacitive current transmission between the upper plate and the lower plate.

This is possible, in particular, in a configuration in which the peripheral frame is physically separated completely from the proof subassembly by etching the silicon of the central plate through its full thickness between the frame and the subassembly (over the entire periphery of the latter).

BRIEF DESCRIPTION OF THE DRAWINGS

Other characteristics and advantages of the invention will become apparent on reading the detailed description which follows, and which is given with reference to the appended drawings, in which.

DESCRIPTION OF THE PREFERRED EMBODIMENTS

Before entering into the production of the accelerometer according to the invention, the general principle by which the proof mass is suspended will be explained with reference to FIG. 1. The downward vertical arrow indicates the sense of the force of gravity exerted on the center of gravity G of the proof mass M. The horizontal planes mentioned below are perpendicular to the plane of the figure and pass through the horizontal lines in FIG. 1.

The mass M is suspended cantilevered by two different structures.

The first structure is the vibrating beam forming a resonator R. The former is connected, on the one hand, to the proof mass M at an attachment point T and, on the other hand, to a fixed framework of the accelerometer; it is placed in the horizontal plane of the upper part of the proof mass or close to this plane. It forms one electrode of a capacitor, another electrode C of which consists of a fixed conducting framework element placed above the vibrating beam.

Figure 1:
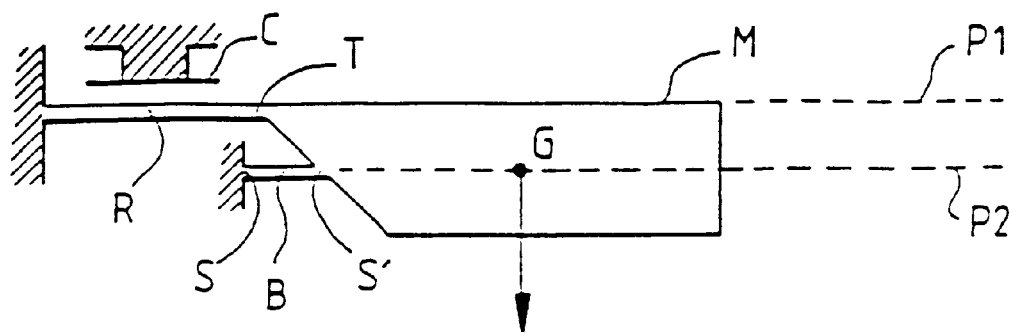
FIG. 1 represents the principle by which the proof mass of the accelerometer is articulated.

The second structure is a suspension which is much more flexible than the beam, forming somewhat of an articulation about which the beam tends to turn when the mass M is subjected to an acceleration along a vertical sensitive axis; the axis of this articulation is horizontal and perpendicular to the plane of FIG. 1. In practice, this second structure has two short, parallel suspension arms, in a horizontal plane, to prevent twisting movements of the proof mass. These arms are thin sheets located in the same horizontal plane. Only one of these arms, B, can be seen in FIG. 1. The two arms are arranged laterally relative to the vibrating beam, but in a horizontal plane different from that of the vibrating beam: the beam is in the upper plane P1 of the proof mass, but the suspension arms are substantially in a horizontal plane P2 passing through the center of gravity G of the proof mass. This makes it possible to give the accelerometer a sensitive axis in the vertical sense, while minimizing the influence of horizontal accelerations.

The horizontal axis of articulation defined by the side suspension arms is perpendicular to the length of the vibrating beam (this results from the overall symmetry of the structure relative to a vertical plane cutting the beam through its middle in the length sense).

Furthermore, provision is made for this horizontal axis of articulation to pass approximately substantially in line with the point T where the vibrating beam is attached to the proof mass. This arrangement tends to prevent bending movements of the vibrating beam in the presence of vertical accelerations, which movements would interfere with the measurement. The point of articulation of a suspension arm can be regarded as being the point S where the arm is attached to the fixed framework, or the point S' where the arm is attached to the proof mass, or alternatively an intermediate point between S and S', the points S and S' being in any event fairly close together. The horizontal axis of articulation of the proof mass passes through the point thus defined, perpendicularly to the page in FIG. 1, and it is this axis which needs to pass to as great an extent as possible in line with the attachment point T so that a vertical force exerted on the center of gravity G of the mass, which force results in a rotational movement about the axis of articulation, tends to exert horizontal tension without vertical bending on the vibrating beam.

Having thus defined the overall structure of the articulation of the proof mass, the production according to the invention from three silicon plates will be explained in detail.

Figure 2:
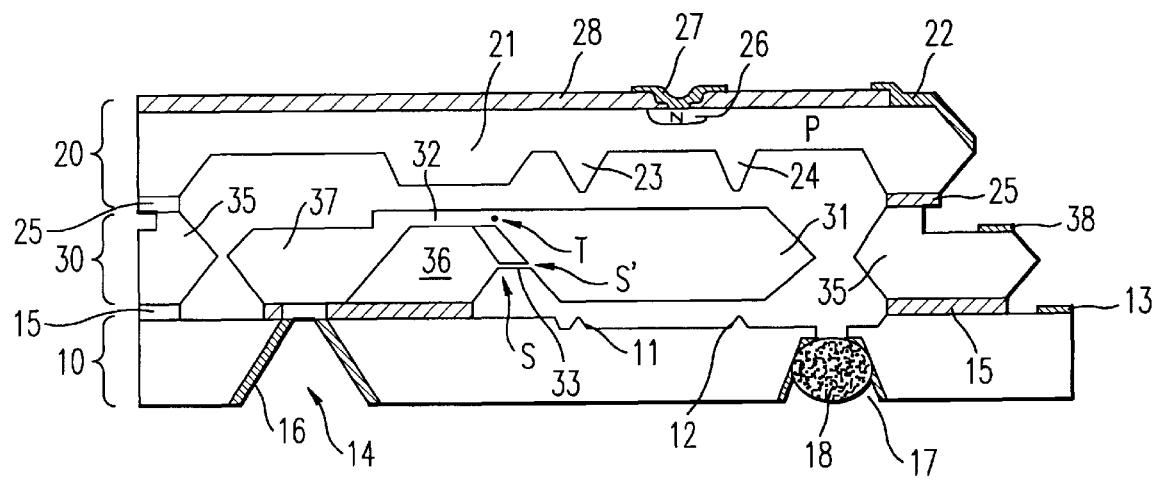
FIG. 2 represents a vertical section of an accelerometer according to the invention.

FIG. 2 represents a cross section of the accelerometer through a vertical plane of symmetry of the accelerometer, namely a plane cutting the proof mass, on the one hand, and the vibrating beam forming a resonator, on the other hand, symmetrically and over their full length. The accelerometer in fact has a structure of overall symmetry with respect to a vertical plane, at least as regards the proof mass and the beam forming a resonator. It will also be assumed in the explanations which follow that the accelerometer is overall arranged horizontally, and that the sensitive axis of the accelerometer is vertical, that is to say the intention is to measure accelerations in the vertical sense, in a construction such that the measurement is influenced as little as possible by horizontal accelerations.

The accelerometer consists of the superposition of three machined-conducting-silicon plates, which are arranged horizontally and are welded or bonded together while remaining separated from one another by thin insulating layers, which are preferably in silicon oxide. The lower plate and the upper plate are respectively denoted by the references 10 and 20. The central plate is denoted by the reference 30. The silicon oxide layer separating the lower plate and the central plate is the layer 15; and the silicon oxide layer separating the central plate and the upper plate is the layer 25. As can be seen, the silicon oxide layer 25 forms complete electrical insulation of the upper and central plates 20 and 30, but the layer 15 is locally interrupted to allow the suspension beam of the proof mass to be electrically connected to the lower plate in order to allow an electrical voltage to be fed from the lower plate 10 to the central plate 30.

Figure 3:
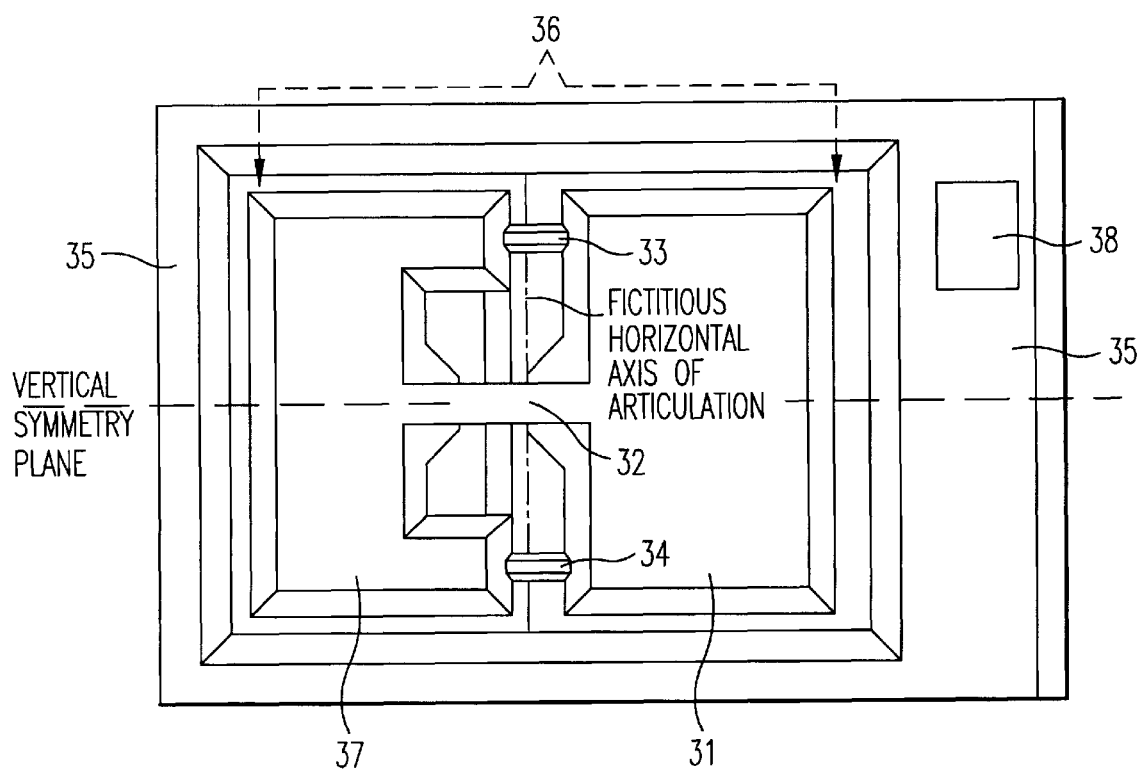
FIG. 3 represents a horizontal top view of the central plate of the accelerometer.

FIG. 3 represents a top view of the central plate 30, in which, in particular, a proof mass 31, a suspension beam 32 connected to the proof mass, and side suspension arms 33 and 34 have been machined. FIG. 2 clearly shows the overall symmetry relative to a vertical plane represented by a dotted line. The beam is centered relative to this plane of symmetry, which cuts it through the middle throughout its length. The proof mass is also cut symmetrically by this plane. The side suspension arms 33 and 34 are arranged symmetrically on either side of this plane of symmetry.

The central plate 30 is in fact formed by two quite separate parts which are electrically insulated from one another and which, for this reason, have been completely separated physically from one another by etching during the fabrication of the accelerometer. The first part 35 is a continuous peripheral frame surrounding the entire second part, which is the active part 36 of the accelerometer. The peripheral frame 35 is essentially used as a connecting spacer between the lower plate 10 and the upper plate 20, for holding these two plates away from one another. It is, however, also used as electrical screening between the plates 10 and 20. The active part 36 of the central plate is entirely located between the lower and upper plates, and inside the peripheral frame 35.

The active part essentially comprises:

a fixed base 37 rigidly connected to the lower plate 10, by bonding or welding, and electrically connected to this plate; this base has, seen from above, a U-shape whose opening is turned towards the proof mass;

the proof mass 31 mentioned already; its thickness if equal or almost equal to the thickness of the central plate; it is held at the base 37 by the cantilever suspension (32, 33, 34);

the vibrating beam 32 forming a resonator, connected on one side to the proof mass and on the other to the fixed base, the connection being placed at the center of the U; its thickness is very small compared to the thickness of the proof mass; it is arranged substantially in the upper plane of the central plate so as to be fairly close to the upper plate; specifically, it forms a capacitor with the upper-plate portion 21 which is directly opposite;

the side suspension arms 33 and 34, which are thin horizontal sheets; they are connected to the proof mass, on the one hand, and to the fixed base 37, on the other hand, for the one part at the end of a first branch of the U, and for the other part, symmetrically, at the end of the second branch of the U; their thickness is even smaller than that of the beam forming a resonator and they are preferably located in a substantially median horizontal plane of the central plate; that is to say in a plane passing virtually through the center of gravity of the proof mass; their length is small compared to the length which separates the end of the U from the center of gravity of the proof mass; furthermore, the U-shape of the base makes it possible to give the vibrating beam 32 a length significantly greater than the length of the suspension arms 33 and 34.

The various elements of the central plate are produced by micromachining the plate. This micromachining consists principally in deep chemical etches in the presence of photolithographic masks which protect the regions that are not to be attacked.

Instead of the foot having a U-shape, provision may be made for it to be the proof mass that has a U-shape open on the side turned towards the base. Provision may also be made for the base and the proof mass to both have a U-shape and be turned towards one another.

In order to separate the peripheral frame 35 from the active part 36, the etching extends through the full thickness of the plate, or more precisely through two times half the thickness because the etching is preferably carried out both from above and from below. The same double deep etching is used to define the U-shape of the base 37 of the active part and the bar (seen from above) shape of the suspension arms 32, 33, 34. In order to define the thickness of the side suspension arms 33 and 34, the etching is also carried out both from above and from below, but leaving a small thickness of silicon remaining. In order to define the thickness of the suspension beam 32, the etching may be carried out only from below and through almost the full thickness of the plate, leaving only the desired thickness remaining. The thickness and the width of the beam are greater than those of the suspension arms, since the rigidity of the beam needs to be much greater than that of the arms.

It will be noted that the etches define oblique rather than vertical etching edges, since the chemical attacking of the silicon actually takes place preferentially along inclined crystal planes.

The three silicon plates are electrically conductive, because they contribute directly to the electrical operation of the micro-accelerometer; they are preferably in heavily P-type-doped silicon (boron doping). Metal contacts are formed by depositing and etching (for example of aluminium) on the lower plate (contact 13 on the edge of the plate), on the peripheral frame 35 of the central plate (contact 38 on the outer edge of the frame), and on the upper plate (contact 22 on the edge of the frame), in order to connect each of these plates to a resonant electrical circuit to which the described structure is connected.

The lower plate 10 is micromachined with the following features:

the area facing the proof mass is attacked to define stops 11, 12 precisely, for example in the form of pyramidal points or narrow strips; these stops make it possible to prevent the beam 32 or the suspension arms 33, 34 from breaking in the event of impact or excessive acceleration in the vertical sense; their small area facing the proof mass makes it possible to limit stray capacitances;

in addition arrangements are made for an electrical contact to be made between the lower plate and the base 37 for holding the proof mass; the preferred means for this is an opening 14 hollowed in the lower plate, through its full depth and across the silicon oxide layer 15; a conductive deposit 16 is made in this opening so as to electrically connect the plate 10 and the base 37; this structure makes it possible for an electrical voltage applied to the contact 13 of the lower plate to be transmitted to the resonant beam 32 by silicon conduction, the beam then constituting a capacitor electrode because of its inherent conduction;

lastly, in the case when the cavity containing the proof mass needs to be evacuated in order to limit the damping of the vibration of the resonant beam as far as possible, provision may be made to machine an opening 17 by chemical etching through the full thickness of the plate 10; this opening can be metallized then closed by a plug 18 (in indium, in particular, or alloy with low melting point) in order to seal the cavity after having evacuated it; evacuation of the hermetic cavity formed by the plates 10 and 20 and the frame 35 makes it possible to avoid having to create a vacuum in the package which encloses the structure; this structure with an internal vacuum makes it possible to test the accelerometer before putting it in a package, which is advantageous.

For its part, the upper plate 20 has the following etched parts:

in order to avoid stray capacitive coupling between the upper plate and the active part 36 of the central plate, the upper plate is deeply etched wherever it faces this active part, except of course where capacitive coupling is desired and is used to measure the acceleration, namely in the part 21 lying exactly above the suspension beam 32;

facing the proof mass, the upper plate is deeply etched, but highly localized stops 23, 24 are left to prevent the proof mass from moving too far, which would run the risk of breaking the suspension beams in the event of impact, in particular; here again, the area of the stops facing the proof mass is small in order to limit stray capacitances;

lastly, the upper plate is not etched facing the peripheral frame 35 of the central plate.

In a preferred embodiment, an element compensating for the variations in temperature is provided in the resonant circuit in which the capacitor thus formed plays a part. It is then possible to integrate this element, here for example a diode, in one of the silicon plates; for example, an N-type region is diffused if the plates are of the P-type. One easy solution consists in providing N-type diffusion, forming a diffused region 26, in the upper part of the upper plate 20, with a contact electrode 27 deposited on this diffused region 26. This contact electrode is produced by metallization (for example of aluminium) which joins (the way in which this happens cannot be seen in the figures) one edge of the upper plate in order to allow connection to the outside of the structure. The metallization is deposited above an insulating layer 28 (for example silicon oxide) which covers all the upper plate apart from the areas for contact connection with the plate and with the diffused region 26.

The connection contact, involving a localized metal deposit 38, provided on the peripheral frame 35 of the central plate, allows a constant potential to be applied to this frame, so that it forms a screen against any capacitive effect between the upper plate and the lower plate. In fact, this capacitive coupling is particularly strong at the resonant frequencies in question (which may be up to several tens of kilohertz) and interferes with the measurement since it adds a capacitance in parallel with the capacitance of the resonator proper.

Figure 4:
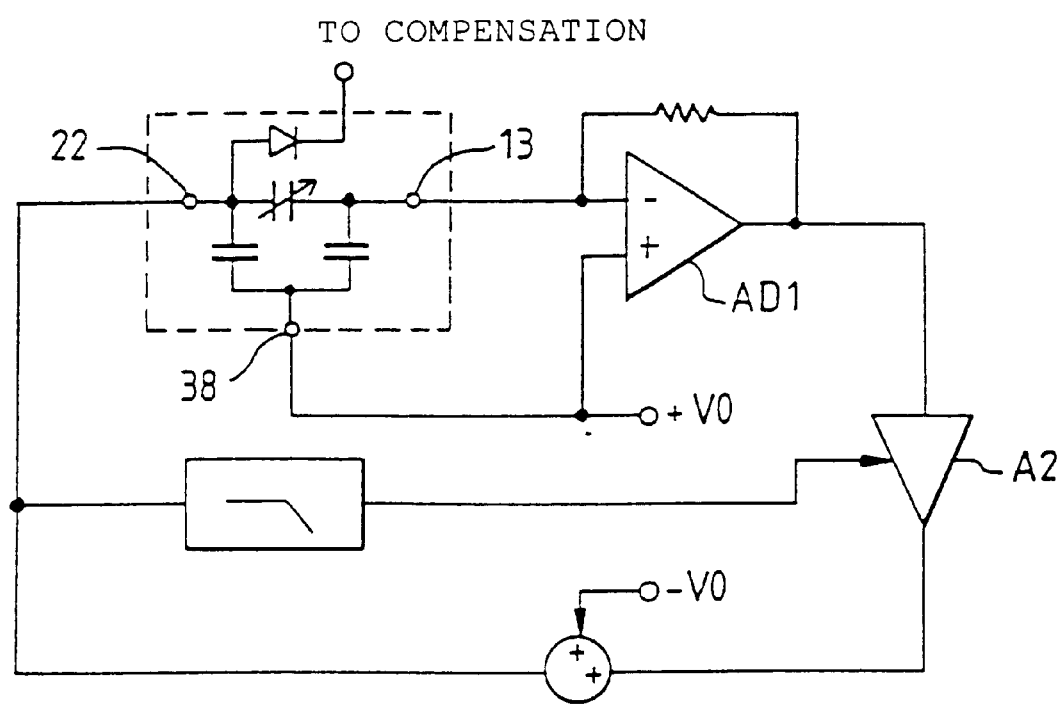
FIG. 4 represents a resonant circuit in which the mechanical structure forming the core of the accelerometer is connected.

FIG. 4 represents a simple electrical diagram in which the structure that has just been described is incorporated. The structure is symbolically represented by a variable capacitor created between the vibrating beam and the upper plate, and two stray capacitances formed between the upper plate and the central plate, on the one hand, and between the lower plate and the central plate, on the other hand.

A differential amplifier AD1 is connected via its inverting input to the connection 13 of the lower plate, and its output is fed back, through a variable-gain amplifier A2 and an adder which adds a bias voltage −V0 to it, to the connection of the upper plate 22. The central plate is connected by its connection 38 to a bias potential +V0 which is furthermore connected to the non-inverting input of the amplifier AD1. The 35 potential V0 is constant and constitutes the interplate electrostatic-screening potential mentioned above. The gain of the amplifier A2 is slaved as a function of the average amplitude of the excitation signal applied to the connection 22 of the upper plate.

This diagram constitutes a resonant circuit which enters oscillation at a frequency that depends on the acceleration. The dependency is non-linear; in general two identical accelerometers are used, head-to-tail in order to produce two sets of frequency information, the difference between which is proportional to a very good approximation and in a very linear way to the acceleration.

Among the beneficial characteristics of the accelerometer according to the invention, it will be noted in particular that it requires no metal deposit on the silicon surfaces lying inside the cavity. This reduces mechanical stresses, thermal effects, and variations in performance over time; furthermore, it is possible to use high-temperature fabrication steps (which would not be possible after depositing metal layers) and these steps improve the assembly quality. Lastly, in general, the fact that the free plates are in silicon considerably reduces the thermal stresses which could be exerted between the plates, either during the fabrication operations after bonding two or three plates, or during operation.

What is claimed is:

1. Micro-accelerometer comprising:
three micromachined conducting-silicon plates bonded in superposition with the interposition of insulating layers, the central plate comprising a subassembly sensitive to accelerations, and a peripheral frame electrically insulated from the subassembly and surrounding the subassembly, said frame forming a spacer between a lower plate and an upper plate from which it is also electrically insulated, the subassembly comprising a base fixed on the lower plate and a cantilevered proof mass suspended from the base, an electrical connection being made between the lower plate and the base of the subassembly, the suspension of the proof mass comprising, on the one hand, a central vibrating beam which is connected to the proof mass and to the base and is placed substantially in the horizontal plane of an upper face of the proof mass, and, on the other hand, two short side suspension arms which are connected to the base and are placed on either side of the central beam but in a horizontal plane passing substantially through the center of gravity of the proof mass.

2. Micro-accelerometer according to claim 1, wherein the base of the proof subassembly has a U-shape seen on a horizontal plane, the inside of the U being turned towards the proof mass, the vibrating beam being connected to the center of the U-shaped base and the side suspension arms being connected to the ends of the branches of the U.

3. Micro-accelerometer according to claim 1, wherein the proof mass of the proof subassembly has a U-shape seen on a horizontal plane, the inside of the U being turned towards the base, the vibrating beam being connected to the center of the U-shaped base and the side suspension arms being connected to the ends of the branches of the U.

4. Micro-accelerometer according to claim 2, wherein the side suspensions arms are shorter than the vibrating beam.

5. Micro-accelerometer according to claim 1, wherein the point where the vibrating beam is fixed on the proof mass lies substantially directly above a bending axis of the proof mass about the fixture represented by the suspension arms.

6. Micro-accelerometer according to claim 1, wherein the middle of the vibrating beam lies substantially directly above a bending axis of the proof mass about the fixture represented by the suspension arms.

7. Micro-accelerometer according to claim 1, wherein the peripheral frame is physically separated from the proof subassembly by etching the silicon of the central plate through its full thickness between the frame and the subassembly, over the entire periphery of the latter.

8. Micro-accelerometer according to claim 1, further comprising at least one connection contact on each of the silicon plates, the connection contact of the lower plate being used to apply a voltage to the vibrating beam by direct silicon conduction through the lower plate and central plate, the connection contact on the upper plate being used to apply a voltage to an upper-plate area opposite the beam, and the connection contact on the central plate being used to apply a fixed electrostatic-screening potential to this plate.

9. Micro-accelerometer according to claim 8, wherein the silicon of the vibrating beam and the silicon of the opposite upper-plate area form the two electrodes of a capacitor fitted into a tuned electrical circuit by means of the upper-plate and lower-plate contacts.

10. Micro-accelerometer according to claim 1, wherein a temperature compensation element is integrated in one of the silicon plates.

11. Micro-accelerometer according to claim 1, further comprising stops machined in the upper and lower plates facing the proof mass, said stops having a small area facing the proof mass in order to limit stray capacitances.

12. A micro-accelerometer comprising:
a lower conducting plate bonded to a central conducting plate via a first insulating layer; and
an upper conducting plate bonded to said central conducting plate via a second insulating layer,
wherein said central conducting plate comprises:
a subassembly sensitive to accelerations, and
a peripheral frame electrically insulated from the subassembly and surrounding the subassembly,
wherein the subassembly comprises:
a base fixed and electrically connected to said lower conducting plate,
a cantilevered proof mass suspended from the base,
a central beam connected to said base and said proof mass, and
two side suspension arms connected to said base and said proof mass,
wherein said central beam is substantially in a plane of an upper face of the proof mass, and said two side suspension arms are on either side of the central beam in a plane passing substantially through the center of gravity of the proof mass.

13. A micro-accelerometer according to claim 12, wherein said base of said subassembly has a U-shape defining a center and two branches, the central beam being connected to said center and said two side suspension arms being connected to said branches.

14. A micro-accelerometer according to claim 12, wherein said two side suspension arms are shorter than said central beam.

15. A micro-accelerometer according to claim 12, wherein the central beam is connected to the proof mass at a point located above a bending axis of the proof mass.

16. A micro-accelerometer according to claim 12, wherein the middle of the central beam is located above a bending axis of the proof mass.

17. A micro-accelerometer according to claim 12, further comprising at least one connection contact on each of the lower, upper and central conducting plates.

18. A micro-accelerometer according to claim 17, wherein the central beam is electrically connected to said connection contact of said lower conducting plate, and an upper conducting plate area opposite said central beam is electrically connected to said connection contact of said upper conducting plate, so that said central beam and said upper conducting plate area form two electrodes of a capacitor.

19. A micro-accelerometer according to claim 12, further comprising stops located on said upper and lower conducting plates and facing said proof mass, said stops being configured to reduce stray capacitances.

20. A micro-accelerometer according to claim 12, wherein said lower conducting plate, said upper conducting plate, and said central conducting plate comprise silicon.

* * * * *